United States Patent
Anderson et al.

(10) Patent No.: US 6,587,119 B1
(45) Date of Patent: Jul. 1, 2003

(54) METHOD AND APPARATUS FOR DEFINING A PANNING AND ZOOMING PATH ACROSS A STILL IMAGE DURING MOVIE CREATION

(75) Inventors: Eric C. Anderson, San Jose, CA (US); John D. Bernstein, San Jose, CA (US); John F. Pavely, Cupertino, CA (US); Carl J. Alsing, Scotts Valley, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/145,719

(22) Filed: Sep. 1, 1998

Related U.S. Application Data

(63) Continuation-in-part of application No. 09/129,140, filed on Aug. 4, 1998.

(51) Int. Cl.⁷ .................................. G09G 5/00
(52) U.S. Cl. ............... 345/672; 345/473; 345/676; 345/680; 345/682; 345/687
(58) Field of Search ................. 345/433, 473, 345/169, 810, 474, 682–687, 672, 676, 680; 348/103, 96

(56) References Cited

U.S. PATENT DOCUMENTS

| | | | | |
|---|---|---|---|---|
| 4,694,345 A | * | 9/1987 | Rodgers | 348/103 |
| 5,111,291 A | * | 5/1992 | Erickson et al. | 348/103 |
| 5,469,209 A | * | 11/1995 | Gunday et al. | 348/96 |
| 5,542,037 A | * | 7/1996 | Sato et al. | 345/433 |
| 5,615,384 A | * | 3/1997 | Allard et al. | 345/169 |
| 5,657,402 A | * | 8/1997 | Bender et al. | 382/384 |
| 5,767,845 A | * | 6/1998 | Oashi et al. | 345/473 |
| 6,232,973 B1 | * | 5/2001 | Dow et al. | 345/810 |

FOREIGN PATENT DOCUMENTS

| | | | | |
|---|---|---|---|---|
| GB | 2160748 | * | 5/1985 | 358/83 |

OTHER PUBLICATIONS

Hoad et al. "Automatic Control of Camera Pan, Zoom and Focus for Improving Object Recognition", IEEE, published 7/95, pp. 291–295.*

Nakamae et al. "Computer Generated Still Images composited with Panned LAnscape Video Sequences", IEEE, published 1998, pp. 61–70.*

* cited by examiner

*Primary Examiner*—Mark Zimmerman
*Assistant Examiner*—Kimbinh T. Nguyen
(74) *Attorney, Agent, or Firm*—Sawyer Law Group LLP

(57) ABSTRACT

A method and apparatus for enabling a user to define a panning and zooming path across a still image in a digital imaging device during interactive movie creation. The method and apparatus include allowing the user to define the position of a plurality of key frames on the still image, allowing the user to size the key frames to control the zoom during the movie, and allowing the user to set the key frames on the still image to fix each of the key frame's position and size.

23 Claims, 12 Drawing Sheets

METHOD AND APPARATUS FOR DEFINING A PANNING AND ZOOMING PATH ACROSS A STILL IMAGE DURING MOVIE CREATION

CROSS-REFERENCE TO RELATED APPLICATIONS

This is a continuation-in-part of U.S. patent application Ser. No. 09/129,140 filed on Aug. 4, 1998, entitled "Interactive Movie Creation From One Or More Still Images In Digital Imaging Device," which is herein incorporated by reference.

FIELD OF THE INVENTION

The present invention relates generally to digital imaging devices, and more particularly to a method and apparatus for defining a panning and zooming path across a still image during movie creation in such a device.

BACKGROUND OF THE INVENTION

The use of digital video cameras and digital still cameras is becoming widespread. Digital video cameras differ from digital still cameras in a number of respects. Digital video cameras capture approximately thirty frames per second and are optimized to capture a large amount of moving images, but sacrifice image quality. That is, digital video cameras typically capture thirty low-resolution 640×480 images per second. However, the uncompressed digital video signals from all those low resolution images require huge amounts memory storage, and high-ratio real-time compression schemes, such as MPEG, are essential for providing digital video for today's computers. Unfortunately, the hardware to support such processing is expensive, placing most digital video cameras outside the reach of most consumers.

Still digital cameras offer a less expensive alternative to digital video cameras, but are used primarily for capturing high quality static photographs. Still digital cameras are less expensive because they have far less processing power and memory capacity than digital video cameras. Even with these limitations, some still digital cameras are also capable of capturing sequential images, such as a burst image. A burst image is a series of images captured in rapid succession, such as 3 images per second, for instance.

A typical still digital camera equipped with a LCD screen operates in two modes, capture or record mode for capturing images, and play mode for playing back the captured images on the LCD screen. Unfortunately, even still digital cameras capable of capturing burst images are incapable of displaying the images comprising the burst in play mode as a movie. One reason it is that a burst image usually includes only 3–8 images and therefore does not have a sufficient number of images to display as a movie. And even if there were enough images to play as a movie, the camera would be incapable of displaying the images at the high frame rate required for a movie presentation. This is because the camera would have to retrieve each image from memory, decompress, resize and then display each image. Due to the limited resources of today's still digital cameras, the display of a burst image resembles more of a slide show than a movie.

Accordingly, what is needed is a method and apparatus for interactively creating a movie from one or more still images in a digital camera. The present invention addresses such a need.

SUMMARY OF THE INVENTION

The present invention provides a method-and apparatus for enabling a user to define a panning and zooming path across a still image in a digital imaging device during interactive movie creation. The method and apparatus include allowing the user to define the position of a plurality of key frames on the still image, allowing the user to size the key frames to control the zoom during the movie, and allowing the user to set the key frames on the still image to fix each of the key frame's position and size.

In a first embodiment for enabling a user to define a panning and zooming path, the key frames automatically appear on the image and the user utilizes a four-way controller to position the key frames, and uses and soft keys to resize the key frames accordingly. In a second preferred embodiment, the user manually draws the key frames in their desired location using a combination of the four-way controller and the soft keys. In further embodiments, the present invention also enables the user to define whether the path defined by the key frames is straight or curved; the displacement of the key frames in time, and the play back acceleration of the image frames between the key frames.

DETAILED DESCRIPTION OF THE INVENTION

The present invention relates to a method and apparatus for generating a digital movie from digital still images. The following description is presented to enable one of ordinary skill in the art to make and use the invention and is provided in the context of a patent application and its requirements. Although the present invention will be described in the context of a still digital camera, various modifications to the preferred embodiment will be readily apparent to those skilled in the art and the generic principles herein may be applied to other embodiments. That is, any digital imaging capture device which captures, stores, or displays digital images, could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
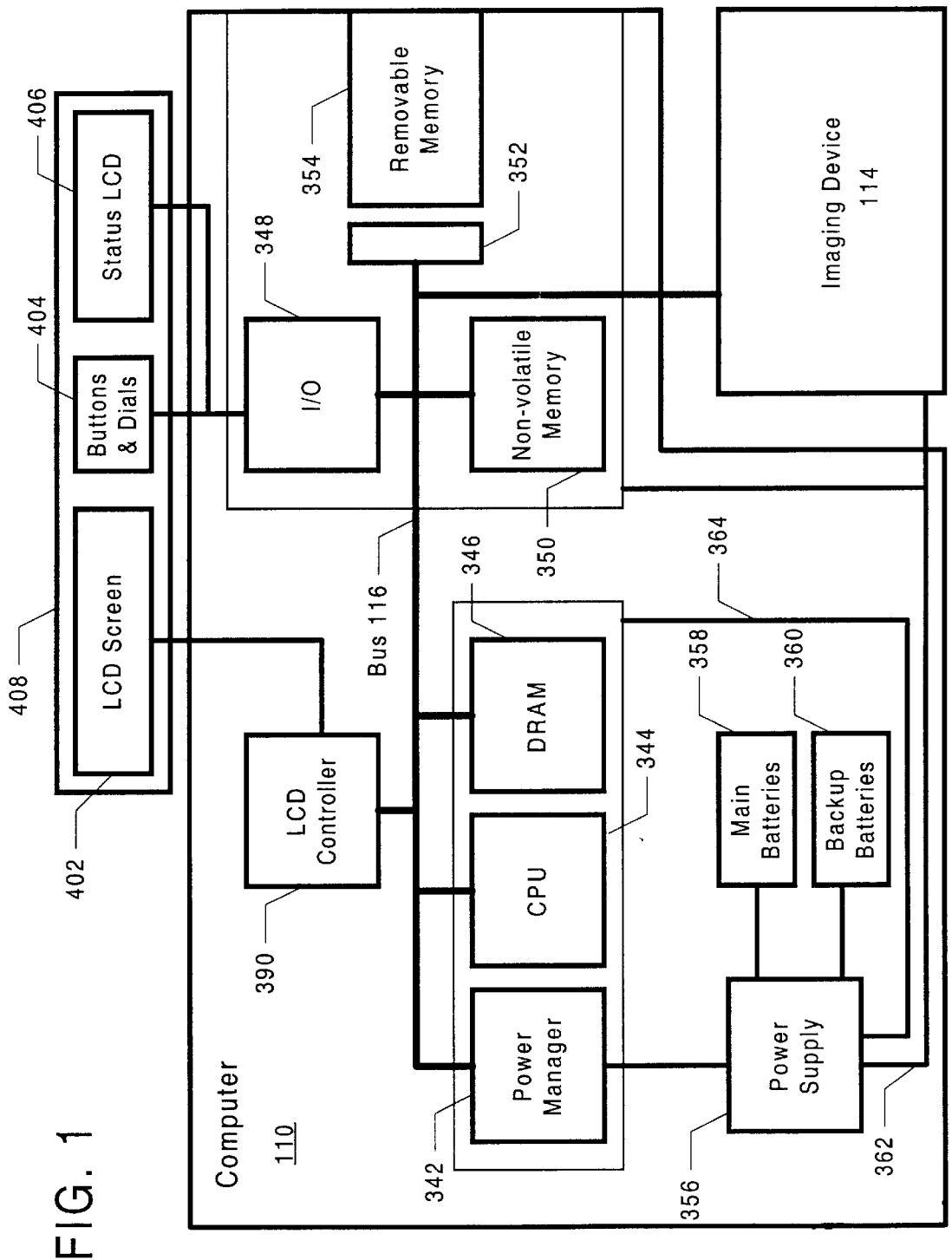
FIG. 1 is a block diagram of a digital camera that operates in accordance with the present invention.

Referring now to FIG. 1, a block diagram of one preferred embodiment of a digital camera 110 is shown for use in accordance with the present invention. Camera 110 preferably comprises an imaging device 114, a apparatus bus 116 and a computer 118. Imaging device 114 includes an image sensor, such as a charged coupled device (CCD) or a CMOS sensor, for generating a set of raw image data representing a captured image. In a preferred embodiment, apparatus bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect an optional removable memory 354 to apparatus bus 116.

CPU 344 may include a conventional microprocessor device for controlling the operation of camera 110. In the preferred embodiment, CPU 344 is capable of concurrently running multiple software routines to control the various processes of camera 110 within a multithreaded environment. For example, images may be captured at the same time that previously captured images are processed in the background to effectively increase the capture rate of the camera. In a preferred embodiment, CPU 244 runs a operating apparatus that includes a menu-driven GUI and provides image processing through software, rather than hardware. An example of such software is the Digita™ Operating Environment by FlashPoint Technology of San Jose, Calif. Although CPU 344 is preferably a microprocessor, one or more DSP's (digital signal processor) or ASIC's (Application Specific Integrated Circuit) could also be used.

I/O 348 is an interface device allowing communications to and from computer 118. For example; I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, such as a flash disk, readily removable and replaceable by a camera 110 user via buffers/connector 352.

Power supply 356 supplies operating power to the various components of camera 110. Power manager 342 communicates via line 366 with power supply 356 and coordinates power management operations for camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Dynamic Random-Access-Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers (not shown) within DRAM 346. Once the raw image data is processed, it is stored in a frame buffer (not shown) for display on the LCD screen 402. In a preferred embodiment, the input buffers and the frame buffer are split into two ping-pong buffers to improve the display speed of the digital camera and to prevent the tearing of the image in the display 402. After processed image data has been stored in DRAM 346, LCD controller 390 transfers the image data to LCD screen 402 for display.

Figure 2A:
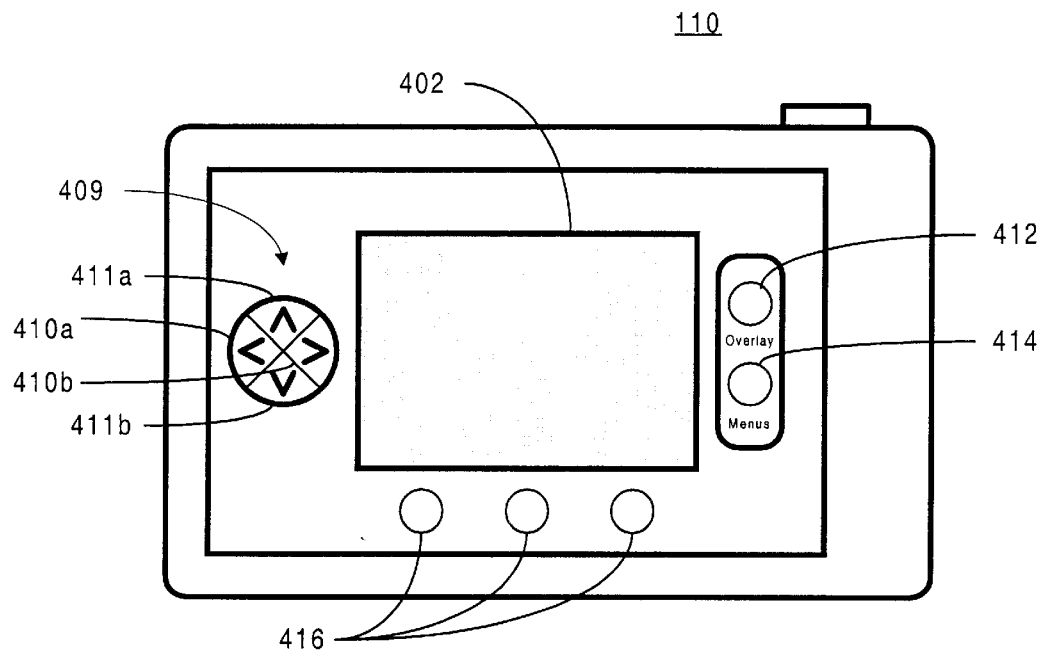
FIGS. 2A and 2B are diagrams depicting exemplary hardware components of the camera's user interface.
Figure 2B:
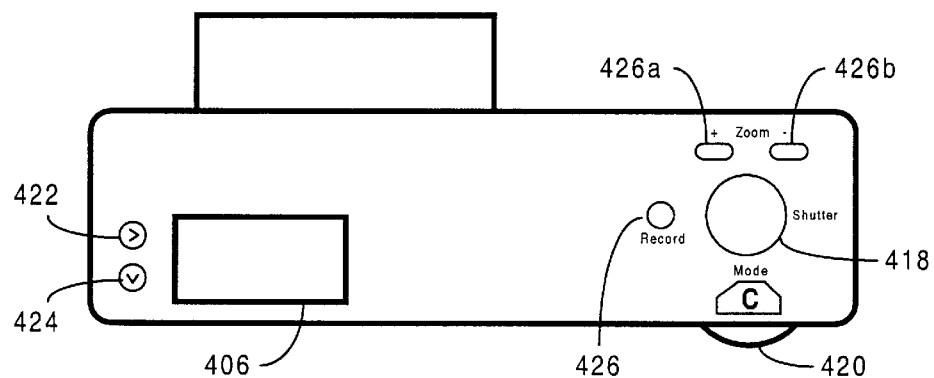

FIGS. 2A and 2B are diagrams depicting exemplary hardware components of the camera's user interface 408. FIG. 2A is back view of the camera 110 showing the LCD screen 402, a four-way navigation control button 409, an overlay button 412, a menu button 414, and a set of programmable soft keys 416. FIG. 2B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

Figure 4A:
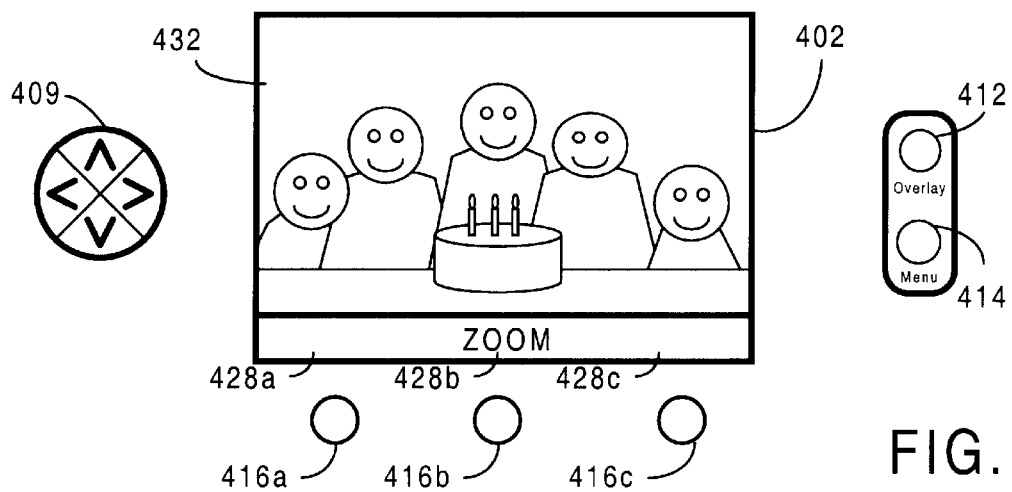
FIG. 4A is a diagram showing an example image displayed on the LCD screen in play mode.

The camera operates in at least two modes, capture mode for capturing images, and play mode for playing back the captured images on the LCD screen 402. FIG. 4A is a diagram showing an example image 432 displayed on the LCD screen 402 in play mode. Displayed images may be manipulated by soft keys 416a, 416b, and 416c, which are programmable, i.e., they may be assigned predefined functions. The function currently assigned to a respective soft key 416 is indicated by a soft key labels 428a, 428b, and 428c displayed on the LCD screen 402. After the soft key labels 428 have been displayed, the user may then press the corresponding soft key 416 to have the function indicated by its label applied to the current image.

The functions assigned to the soft keys 416, and thus the soft key labels 428, are changed in response to several different factors. The soft keys 416 may change automatically either in response to user actions, or based on predetermined conditions existing in the camera, such as the current operating mode, the image type, and so on.

Referring to FIG. 4A for example, the function assigned to the soft key 428b in during play mode is a "Zoom" function, which allows a user to enlarge the displayed image 432. When the user zooms-in on an image by pressing the soft key 428b, the "Zoom" soft key label 428b is toggles to "Zoom-out," which returns the image to normal size.

In a preferred embodiment, the camera is capable of capturing single still images as well as sequential images, which are objects comprising multiple images. Examples of a sequential image include a panorama image, a burst image, and a time lapse image. A panorama image comprises several overlapping images of a larger scene. A burst image is a series of images captured in rapid succession, such as 3 images per second, for instance. And a time lapse image is a series of images automatically captured by the camera at predefined time intervals for a defined duration (e.g. capturing a picture every five minutes for an hour.

Although the camera is capable of capturing sequential images, such as burst images, and time lapse images, the camera can only play the objects back at a relatively slow frame rate because each image must be retrieved from memory, decompressed, resized and then displayed. The play back of a burst image or a time lapse resembles more of a slide show than a movie. And since the images are taken at such disparate times, there is insufficient continuity between the images to provide smooth video play back even if the camera had the capability of displaying the images at a high frame rate.

The present invention is a method and apparatus for interactively creating a movie from one or more images in a digital camera. According to the present invention, a panning and zooming path of a set of small frames is defined across a still image. Thereafter, a number of image frames is generated between the key image frames, such that when the sequence of frames is displayed at regular time intervals, it appears similar to a panning motion picture. A movie can also be created from several still images taken at different times and of adjacent (or the same) views using a similar technique. The resulting frames from each of the still images are then appended together to create a longer presentation. According to the present invention, the user may control the placements of the frames, zooms, time intervals, and other photographic parameters to create the desired motion effects.

Figure 3:
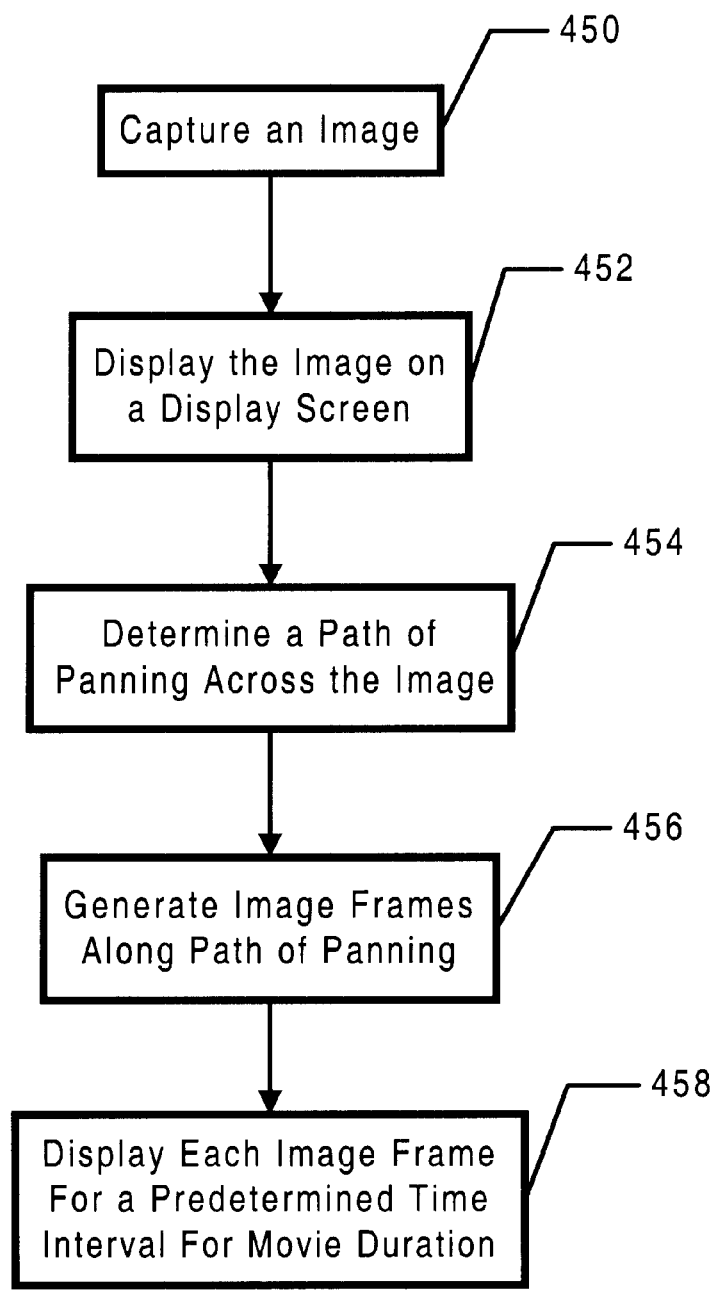
FIG. 3 is a flow chart illustrating the basic process of creating a movie from a still image in accordance with the present invention.

FIG. 3 is a flow chart illustrating the basic process of creating a movie from a still image in accordance with the present invention. Initially, the user places the camera in capture mode and captures a desired image in step 450. The user then switches the camera to play mode to display the captured image or a previously captured image on the LCD screen 402 in step 452. FIG. 4A shows an example of an image 432 displayed on the LCD screen 402 in play mode.

Figure 4B:
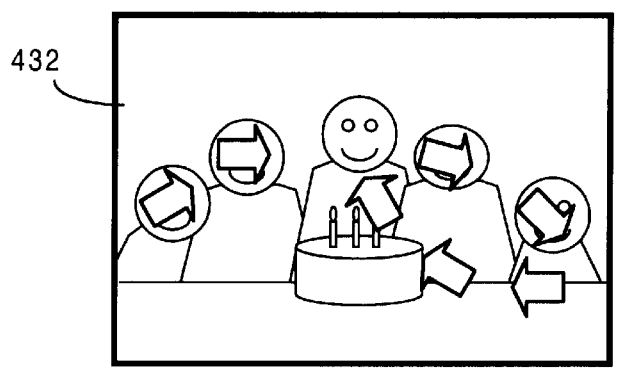
FIG. 4B is a diagram illustrating an example path of panning across a still image.

Once a previously captured image is displayed, a path of panning and zooming across the image is determined in step 454. The path of panning defines how the finished movie will appear to the user to sweep across the scene depicted in the image. FIG. 4B is a diagram illustrating an example path of panning across image 432 shown by the arrows. In a preferred embodiment, the path of panning is manually determined by the user through the placement of a sequence of key image frames in the image, as explained further below. The location of the key image frames in relation to each other determines the panning path.

Referring again to FIG. 3, after the path of panning and zooming has been determined, the camera generates image frames along the path in step 456. This is accomplished by generating image frames between each adjacent pair of key frames.

Figure 5:
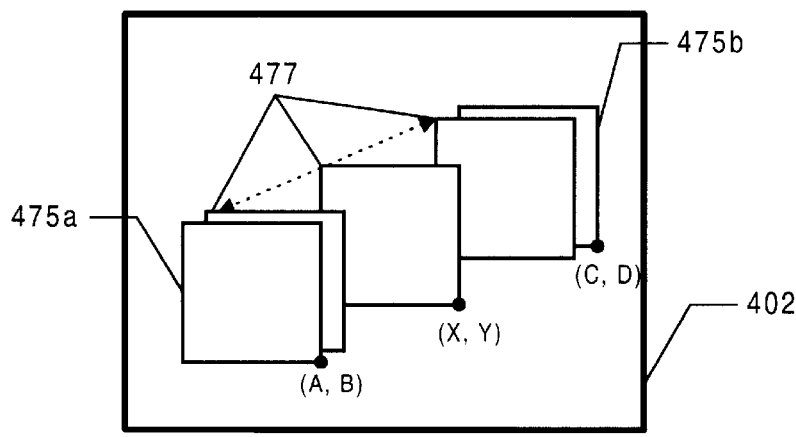
FIG. 5 is a diagram illustrating several image frames generated between an adjacent pair of key image frames.

FIG. 5 is a diagram illustrating several image frames 477 generated between an adjacent pair of key image frames 475a and 475b. Generating the image frames 477 requires calculating: 1) the number of frames to generate between each pair of key image frames 475, 2) the position of each image frame 477 on the image, and optionally, 3) the size of each image frame 477 which determines the zoom factor.

The number of image frames 477 to generate between the key image frames 475 will be dependent upon the following combination of variables: 1) the frame rate at which the movie will be displayed and the duration of the movie; or 2) the frame rate at which the movie will be displayed and a time stamp associated with each key image frame. Each of the above variables may be either preset or entered by the user. The actual equations for calculating the number of image frames 477 from these variables would be readably apparent to those skilled in the art.

In another aspect of the present invention, a path of zooming may also be determined along the path of panning. Whereas the path of panning simulates the motion of a movie camera across a scene, the zoom path simulates the amount by which the movie zooms in and out of the scene. In a preferred embodiment, the zoom path is controlled by the size of the key image frames; a larger key image frame followed by a smaller key image frame simulates zooming in on a scene, and vice versa. In a second preferred embodiment, a zoom function is not provided to simplify the process, in which case the size of the key image frames are made constant.

Referring again to FIG. 3, after generating each image frame 477, the image frame 477 is displayed on the LCD screen 402 for a predetermined time interval (e.g. 1/30 of a second for 30 fps) in step 458. In a preferred embodiment, each frame is discarded after it is displayed to reduce storage requirements. Alternatively, the frames may be displayed after they have all been processed and stored.

Just before displaying image frame 477, the image data within the frames from the original image may be resized to fit the LCD screen 402. Displaying the image frames 477 full-sized on the LCD screen 402 at a high frame appears to the user as a smooth panning movie.

The present invention provides a graphical user interface (GUI) for assisting the user in defining a panning and zooming path across a still image during movie creation.

Figure 6:
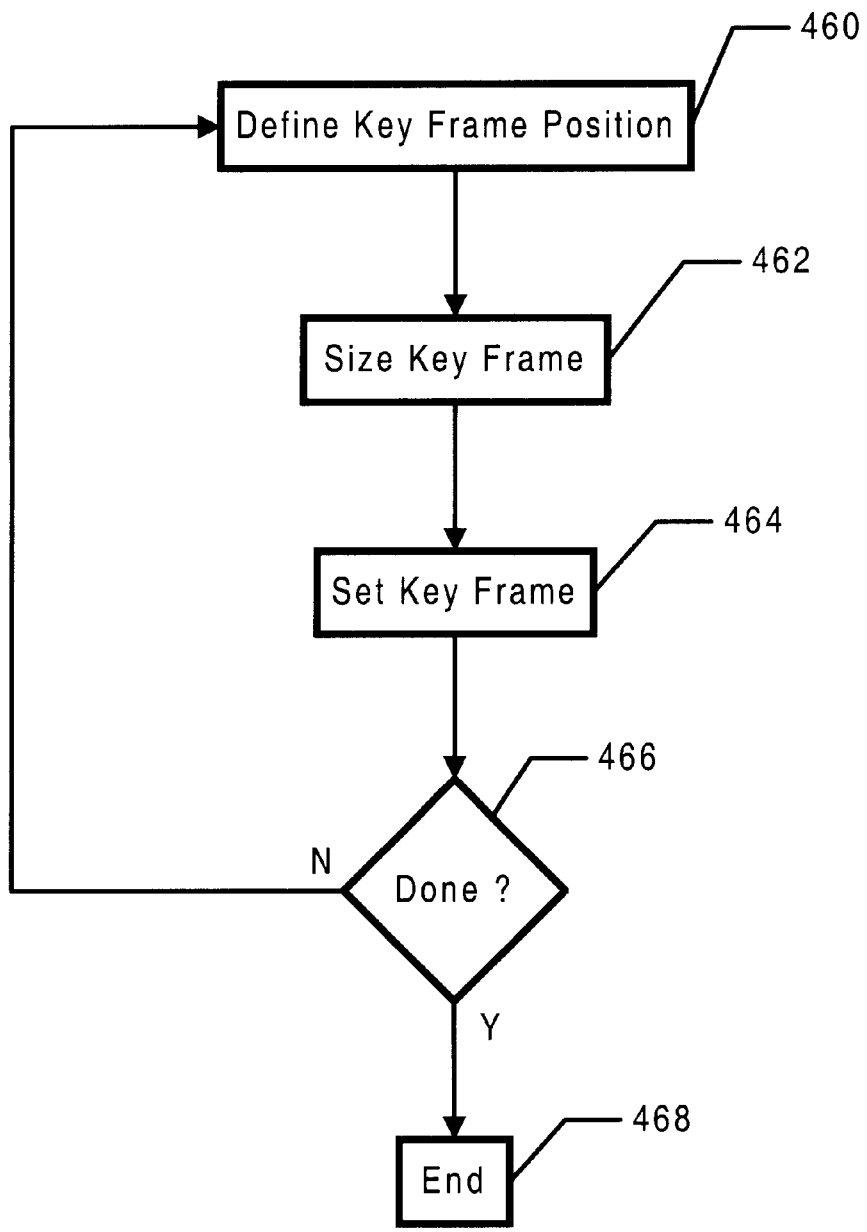
FIG. 6 is flowchart showing the details of step 454 of FIG. 3 for defining a panning and zooming path.

FIG. 6 is flowchart showing the details of step 454 of FIG. 3 for defining a panning and zooming path. As stated above, the panning and zooming path is accomplished by the placing a sequence of key frames 475 within image.

The process begins by the user defining a key frame 475 position in step 460. After defining the position of the key frame 475, the user may size the key frame 475 to control the zoom factor in step 462. Alternatively, the user may define the size of the key frame 475 before defining its position. After positioning the key frame 475 and optionally resizing it, the user sets the key frame 475 in step 464 to fix the key frame's size and position. After the user sets the key frame 475, the user repeats the process in step 466 until the user indicates the path is complete, which ends the process in step 468.

Two preferred embodiments for placing a sequence of key frames 475 within image according to the present invention will be described. In the first embodiment for enabling a user to define a panning and zooming path, the key frames 475 automatically appear on the image, and the user then uses the four-way controller 409 and the soft keys 416 to place and resize the key frames 475 accordingly. In the second embodiment, the user manually draws the key frames 475 in their desired location using the four-way controller 409 and the soft keys 416.

Figure 7A:
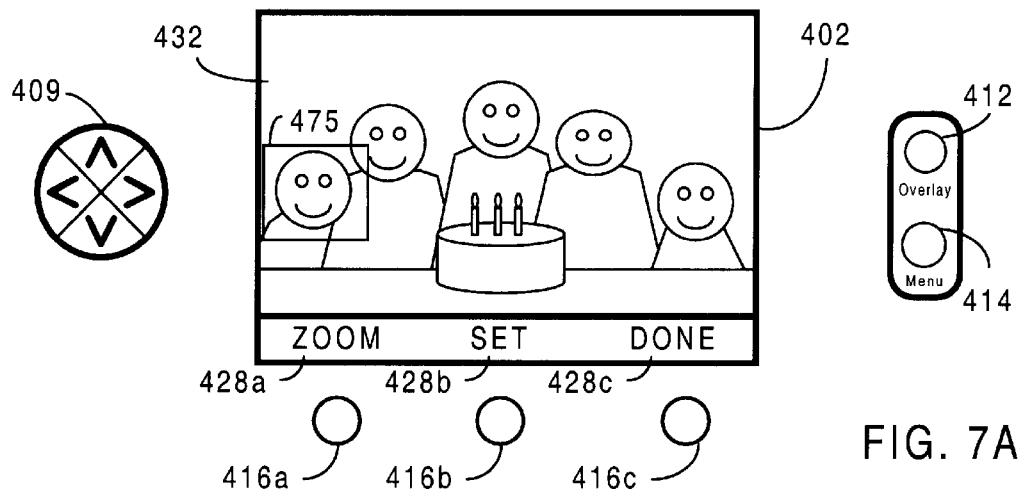
FIGS. 7A–7F are diagrams illustrating a first embodiment for enabling a user to define a panning and zooming path across a still image using key frames.

FIGS. 7A–7E are diagrams illustrating the first embodiment for enabling a user to define a panning and zooming path across a still image using key frames. In FIG. 7A, as soon as the user invokes the movie creation process, the first key frame 475 that will define the starting point of the movie automatically appears on the image 432. Preferably, the key frame 475 appears in the center of the image in a preset size and aspect ratio.

After the key frame 475 appears, the user uses the four-way controller 409 to position the key frame 475 in the desired location, as shown in FIGS. 7A–7E.

Figure 7B:
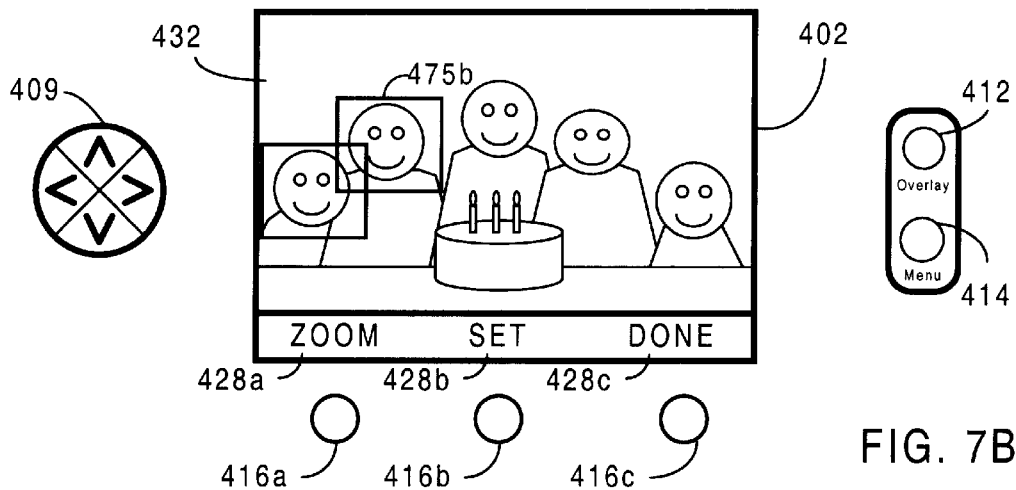
Figure 7C:
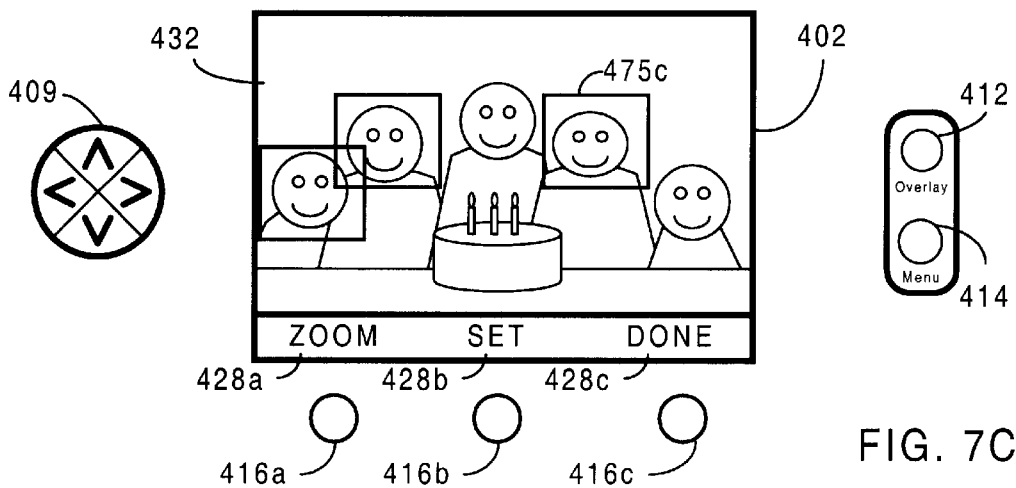
Figure 7D:
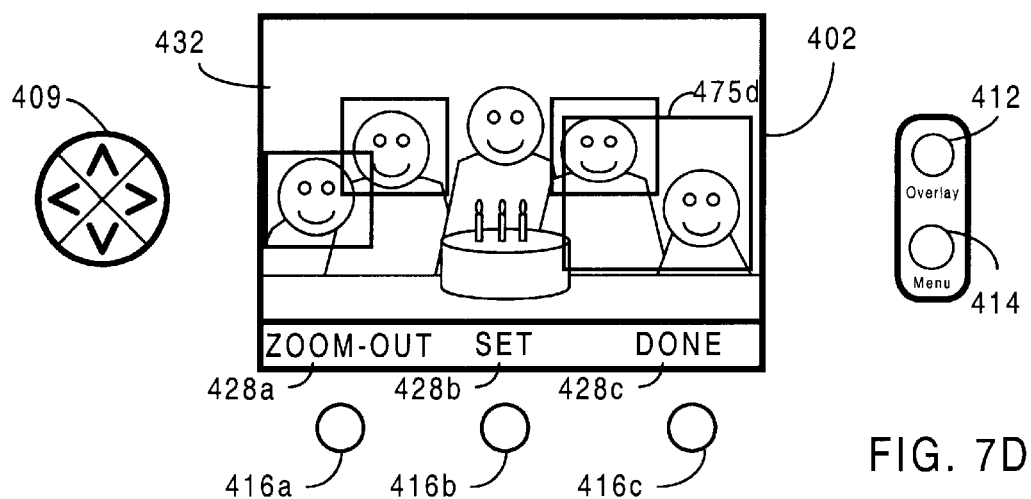
Figure 7E:
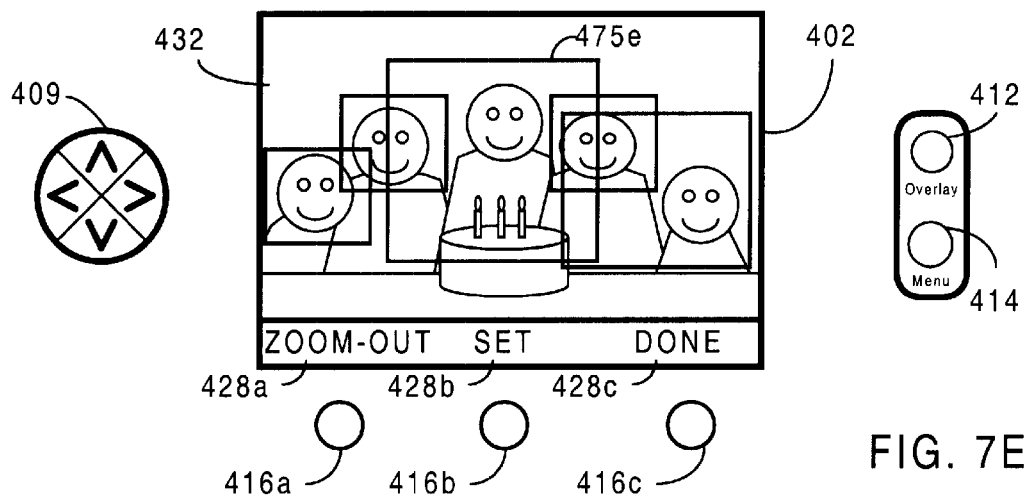

The user may resize the key frame 475 either before or after moving it using the "Zoom" soft key 416a. In one embodiment, the function of soft key 416a toggles between "Zoom" and "Zoom-out" when soft key 416a is pressed. When the "Zoom" soft key label 428a is displayed, holding down the "Zoom" soft key 416a causes the key frame 475 to decrease in size. When the "Zoom-out" soft key label 428a is displayed, holding down the "Zoom-out" soft key 416a causes the key frame 475 to increase. FIGS. 7D and 7E depict examples of where the user "Zoomed-out" on key frames 475d and 475e to enlarge them. This will give the impression of a camera zooming-out of the birthday scene near the end of the movie when the movie is subsequently played. In a second embodiment, the function of soft key 416a toggles between "Zoom" and "Position." When "Zoom" is displayed, the user may change the size of the key frame 475 by pressing the left/right buttons 410a and 410b on the four-way controller 409. Pressing the "Zoom" soft key 416a causes the soft key label 428 to change to "Position." The user may then position the key frame 475 at the desired location using the four-way controller 409.

Referring again to FIG. 7A, after the user has placed and optionally sized a key frame 475, the user presses the "Set" soft key 416b to fix the key frame's position and size. Once the "Set" soft key 416b is pressed the next key frame 475b automatically appears, which the user then positions, as shown in FIG. 7B. The user repeats the above steps until the last key frame 475e is set, as shown in FIG. 7E.

Figure 7F:
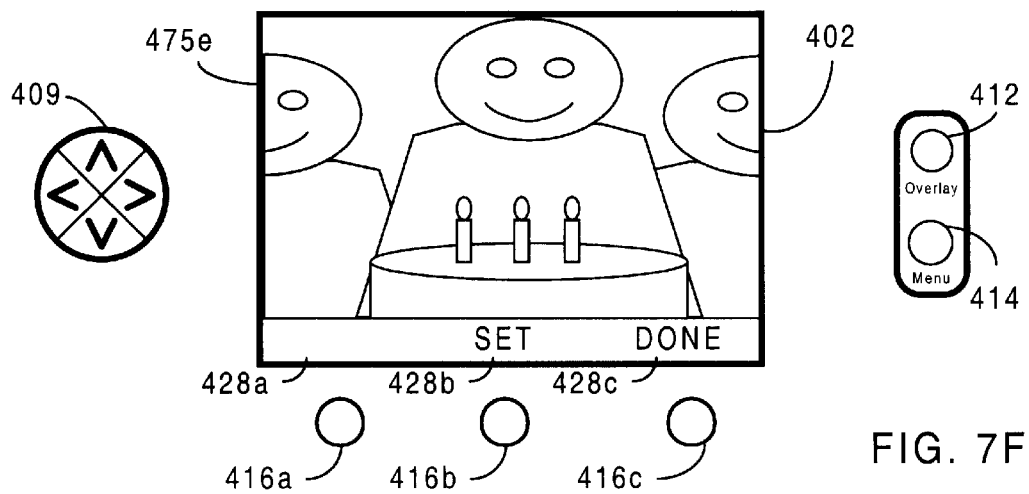

Referring to FIGS. 7E and 7F, the user may view the contents of a currently active key frame 475e full-sized on the LCD screen 402 by pressing the overlay button 412. This allows the user to more easily see what field of view has been chosen by the current key frame 475e. The user may return to the view of the still image with overlaid key frames 475 by pressing the overlay button 412 again. Although the change of view function has been described through the use of the overlay button 412, any other button could also be used, such as the menu button 414 for instance.

When the user has finished placing, resizing and viewing key frames to generate the desired panning and zooming path, the user may press the "Done" soft key 416c to end the process. Thereafter, the camera automatically generates intermediate image frames 477 between each set of adjacent key frames 475 and plays the movie on the LCD screen 402.

In the second embodiment of the present invention, the user manually draws the key frames in their desired location using the four-way controller 409 and the soft keys 416.

Figure 8:
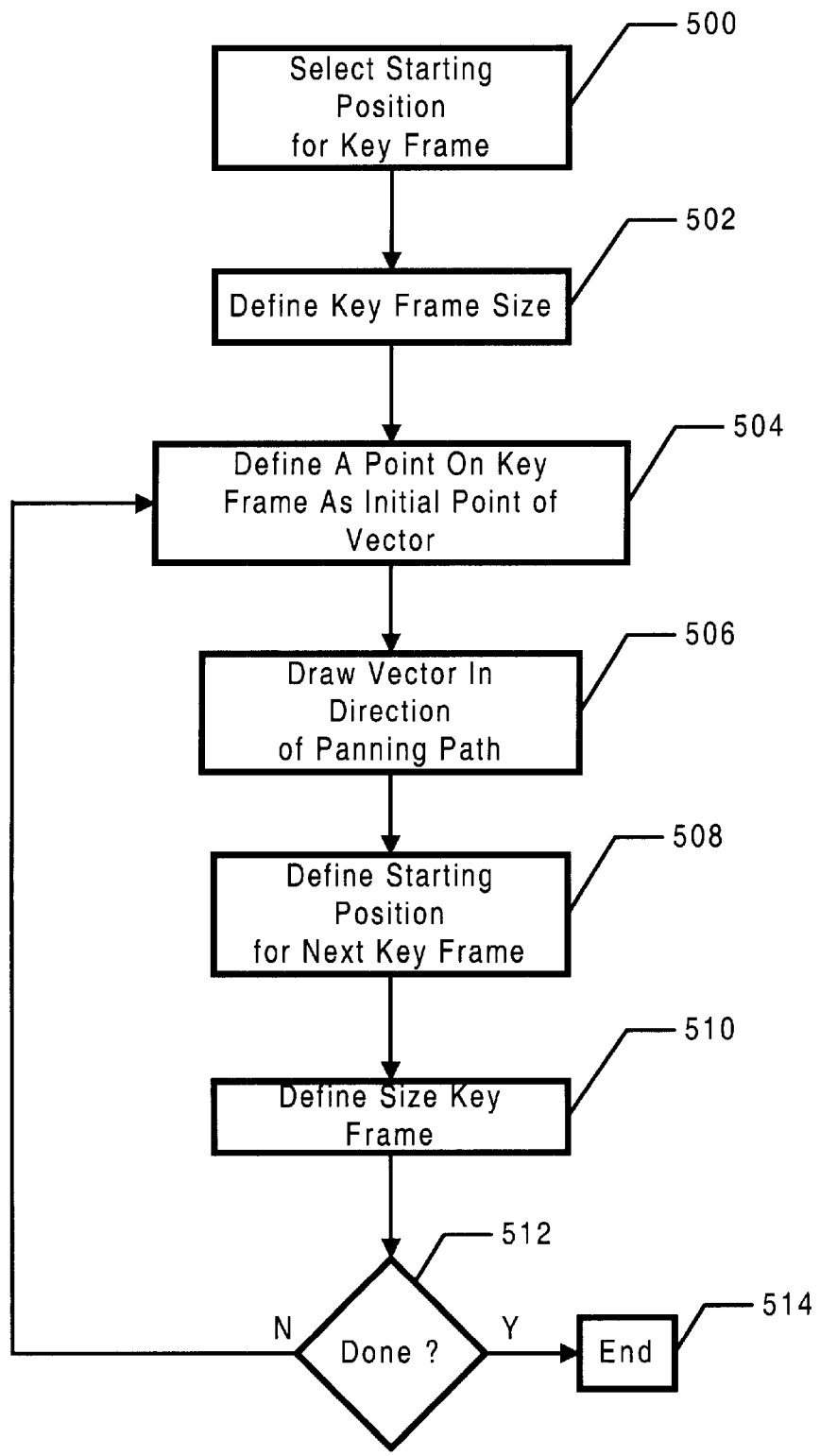
FIG. 8 is a flow chart illustrating a second embodiment for enabling a user to define a panning and zooming path across a still image using key frames.

FIG. 8 is a flow chart illustrating the second embodiment for enabling a user to define a panning and zooming path across a still image using key frames. The process begins once a still image has been displayed on the LCD screen 402. First, the user selects a starting position for the first key frame in step 500.

Figure 9A:
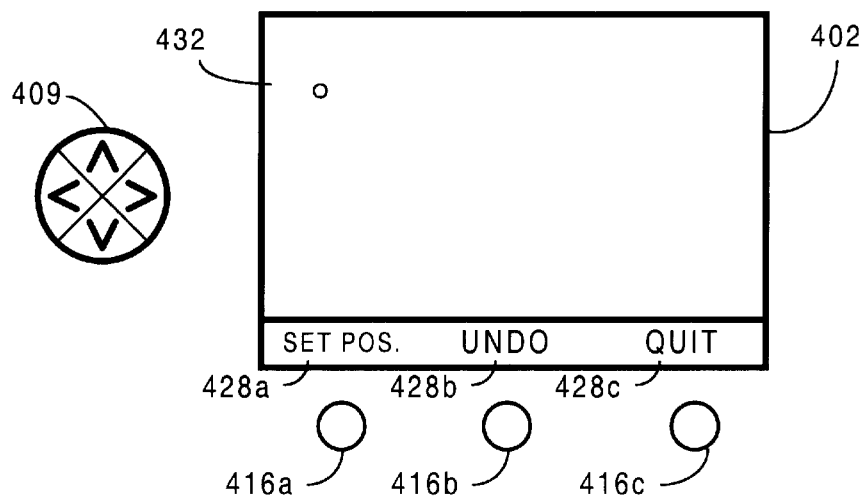
FIGS. 9A–9F is a diagram illustrating the positioning of a cursor over the image using a four-way controller.

As shown in FIG. 9A, this is accomplished by positioning a cursor over the image using the four-way controller 409. In a preferred embodiment, the cursor represents the upper left-hand corner of the key frame. After the user has positioned the cursor, the user presses the "SET POSITION" soft key 416a to anchor the position and the soft key label 428a toggles to "SET SIZE." If the position and/or the size of the key frame need to be changed, the user may press the "UNDO" soft key 416b, or the user may quit the process by pressing the "QUIT" soft key 416c at any time.

Figure 9B:
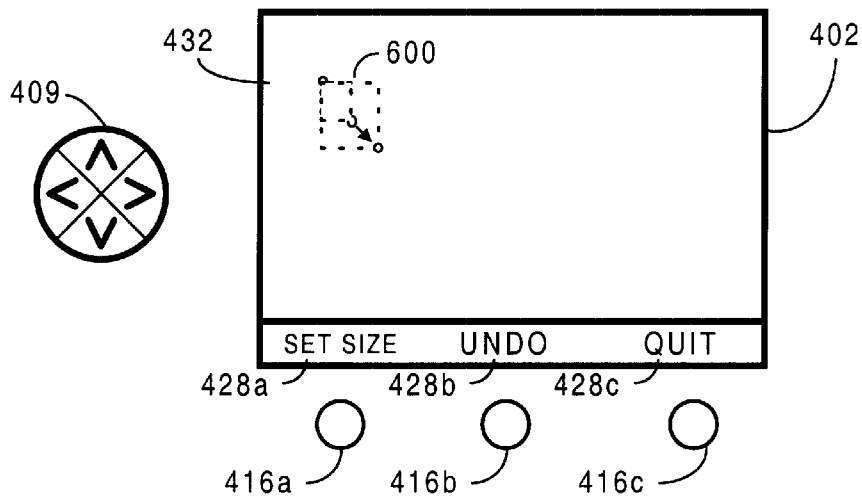

Referring again to FIG. 8, after the cursor is anchored, the user defines the size of the key frame in step 502 by dragging out the opposite corner of the key frame, as shown in FIG. 9B. After achieving the desired size of the key frame 600, the user presses the "SET SIZE" soft key 416a to fix the key frame's size.

Figure 9C:
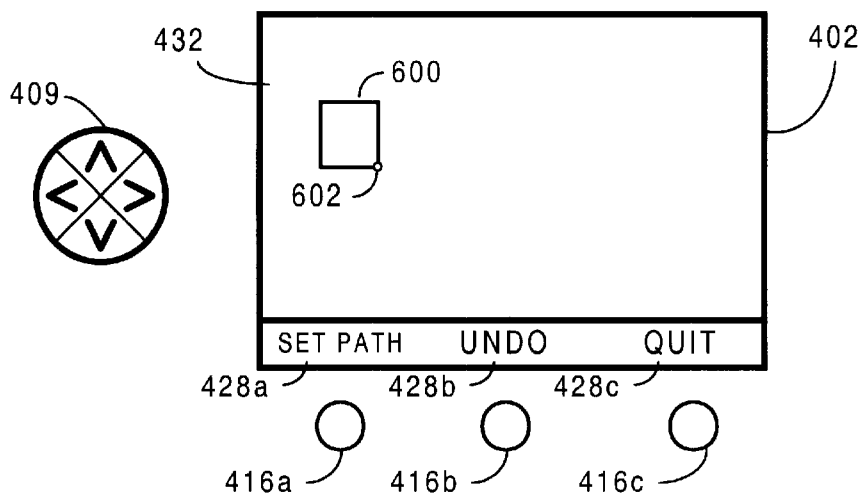

Referring again to FIG. 8, a point on the key frame 600 is then defined as the initial starting point of a vector in step 504. As shown in FIG. 9C, in a preferred embodiment, the starting point 602 is automatically set to a corner of the key frame after the user sets the size of the key frame 600.

Figure 9D:
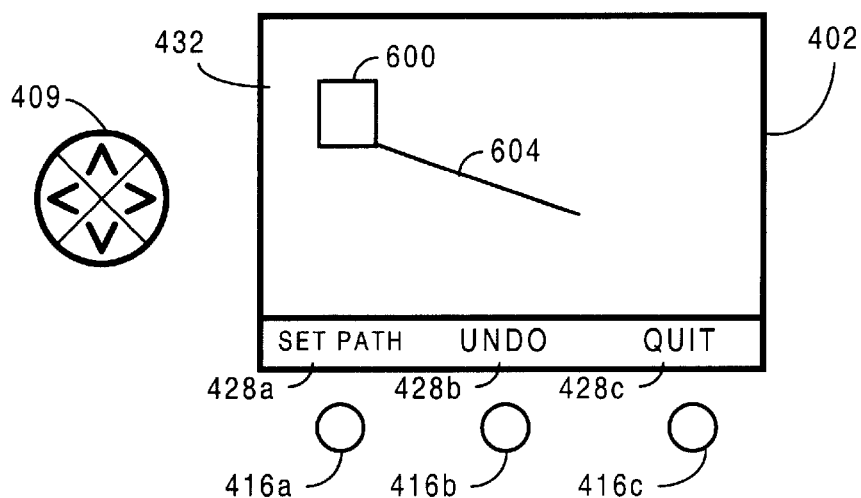

Referring again to FIG. 8, once the starting point 602 is chosen, the user draws a vector 604 using the four-way controller 409 in step 506 by moving the cursor in the direction of the panning path, as shown in FIG. 9D. At this time the soft key label 428a has toggled to "SET PATH," and the user sets the terminal point for the vector by pressing the "SET PATH" soft key 416a.

Figure 9E:
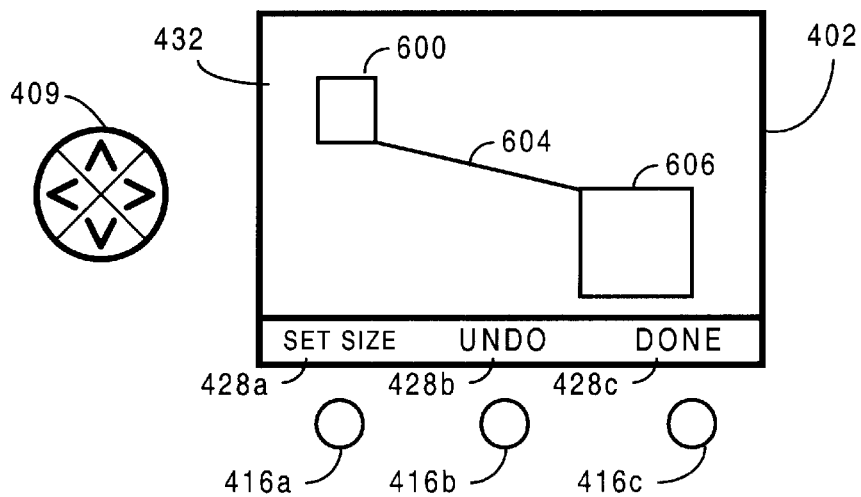

Referring again to FIG. 8, next, a starting position for the next key frame is defined in step 508, which in a preferred embodiment, is the terminal point of the vector 604. After the starting position for the next key frame is defined, the user draws another key frame 606 in step 510. As shown in FIG. 9E, the size of the key frame 606 may be different than the size of the first key frame 600.

Figure 9F:
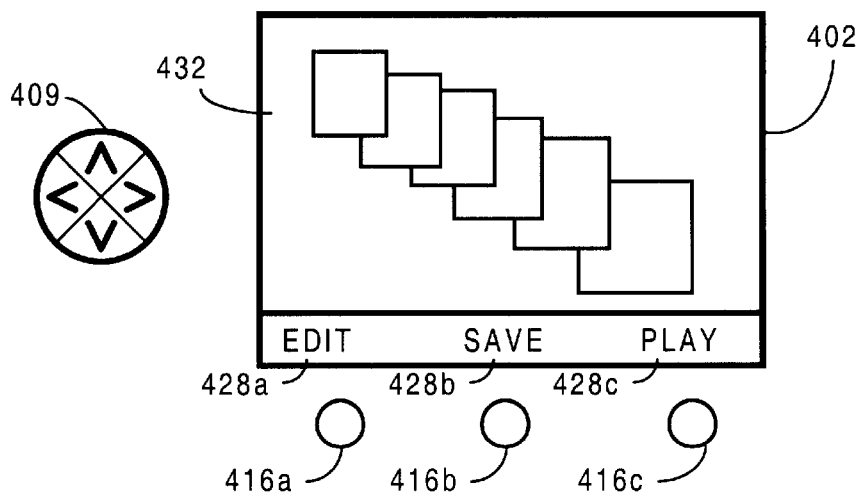

Referring again to FIG. 8, after the user draws the second key frame 606, it is determined if the user has finished defining the panning and zooming path in step 512. If the user has not finished, the user may continue to draw additional vectors and key frames by repeating steps 504–510. If the user has finished, then the process ends in step 514. In a preferred embodiment, the user finishes the process by pressing the "DONE" soft key 416c, as shown in FIG. 9E. When the process ends, the camera generates image frames between the key frames, as shown in FIG. 9F. Also, the user may edit the panning and zooming path by pressing the "EDIT" soft key 416a, save the panning and zooming path by pressing the "SAVE" soft key 416b, or play the generated movie by pressing the "PLAY" soft key 416c.

Figure 9G:
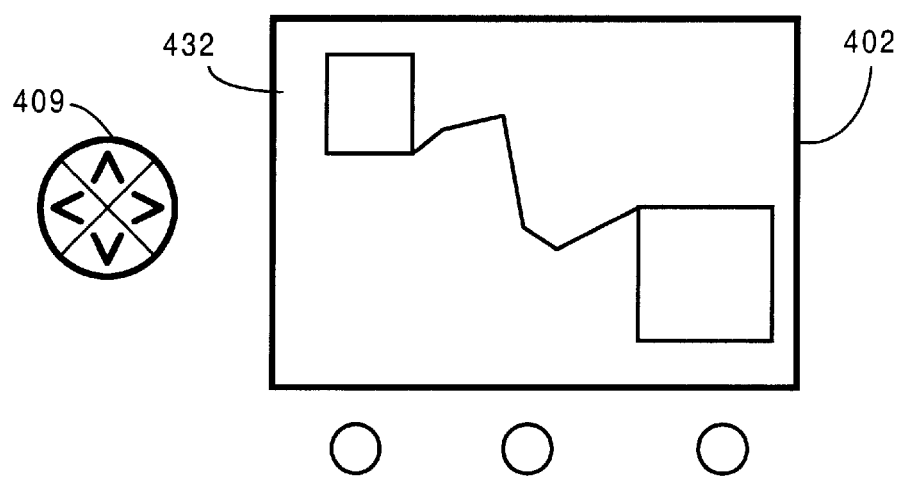
Figure 9H:
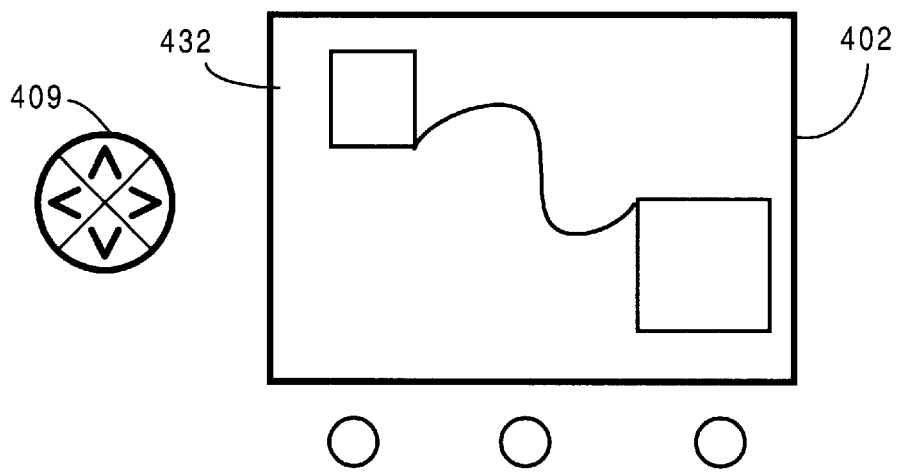

Referring now to FIG. 9G, a diagram is shown of one embodiment of the present invention where multiple vectors are drawn to create the panning and zooming path between two key frames. In addition, FIG. 9H shows that the plurality of vectors can be smoothed by a curve fitting function to create a curved and more life-like panning path for the movie. A more advanced function is to highlight the path between the key frames created by the curve the user has a preview of the movie's field of view.

After defining the key frames in the first and second embodiments of the present invention, the key frames may be evenly spaced throughout the duration of the movie. However, this may not provide the desired result for the movie. For example, in the birthday party picture, the user may want the movie to pan quickly from person to person in the beginning of the movie, but spend the rest of the movie focused on the person over the birthday cake.

Figure 10:
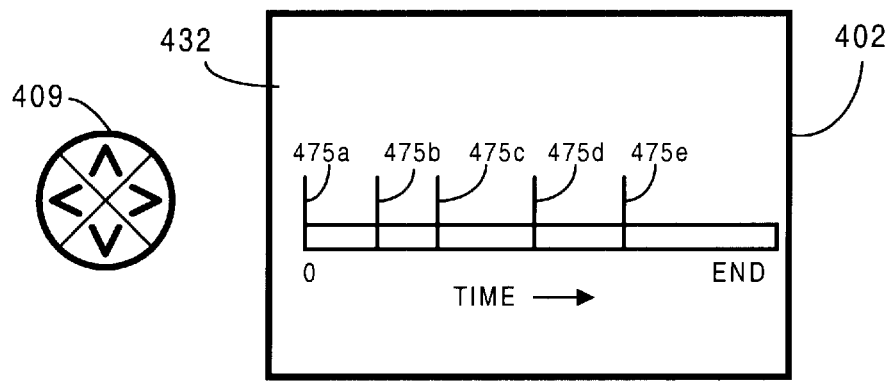
FIG. 10 is a diagram showing one method for allowing the user to displace the key frames by time.

Therefore, a third embodiment of the present invention enables the user to displace the key frames by time. FIG. 10 is a diagram showing one method for allowing the user to displace key frames by time. A time line is displayed representing the duration of the movie. Thereafter the user may use the four-way controller 409 to displace the key frames 475 along the time line as desired. As shown, the first four key frames 475a–475d in the birthday example are displayed in the first ⅔ of the movie, and the last key frame will occupy the remaining ⅓ of the movie.

If the still image 432 has been associated with an audio track, people singing the happy birthday song, for example, then the audio track may be used to allow the user to displace the key frames by time.

Figure 11A:
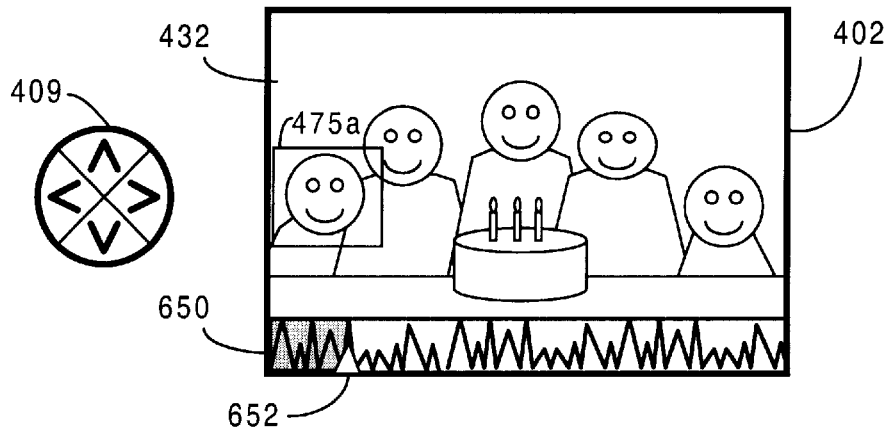
FIGS. 11a–11b are diagrams illustrating the displacement of key frames by time by associating the key frames with a time along an audio track.
Figure 11B:
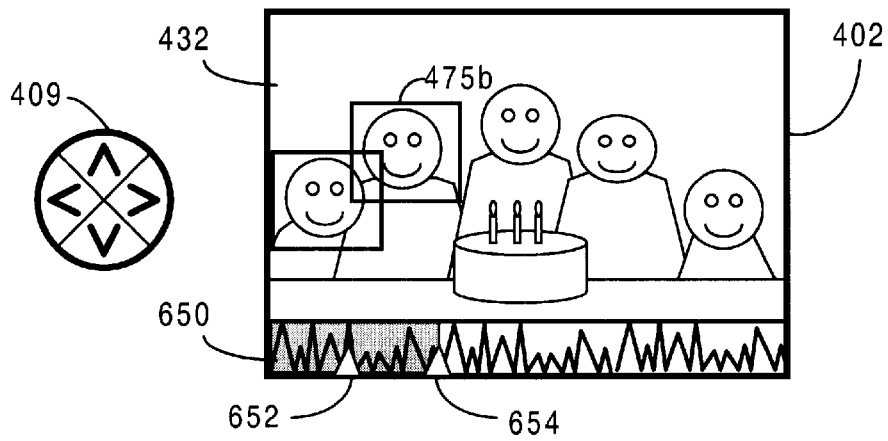

FIGS. 11a–11b are diagrams illustrating the displacement of key frames by time by associating the key frames 475 with a time along an audio track 650. As shown, a representation of the audio track 650 in the form of a waveform is overlaid over the still image 432 to provide both spatial and temporal information to the user.

In a preferred embodiment, the user can use the left/right buttons on the four-way controller 409 to play and rewind the sound. Thereafter, as the user defines each key frame 475, the user may also indicate where along the audio track 650 the key frame 475 should be inserted, shown as insertion points 652 and 654. It should also be noted that the audio track 650 could be associated with the still image either at the time of capture or subsequent to capture.

In a further aspect of the present invention, the user may also specify a acceleration window for defining how fast the movie is to "pan" from one key frame to the next. This provides a more natural feeling to the movie, simulating a camcorder for example, where the photographer pans the camera quickly when moving from one person to the next, but slows the camera while filming that person.

In summary, the GUI of the present invention enables a user to define a panning and zooming path across an image using key frames 475 for interactive movie generation. The GUI may also be used to assist the user in defining the following parameters associated with the key frames: 1) whether the path defined by the key frames is straight or curved; 2) the displacement of the key frames in time; and 3) the play back acceleration of the image frames between the key frames.

Once the specified parameters and sequences are recorded, the image processing can be performed each time the movie is being presented for viewing, thus requiring less storage memory, as described above. The storage memory need only contain the original still image(s) and the processing parameters. Alternatively, the image processing can be carried out to create the movie, and the movie can be stored as a multimedia object for subsequent playback.

A method and apparatus for defining a panning and zooming path across a still image using key frames for interactive movie generation in a digital camera has been disclosed. Although the present invention has been described in accordance with the embodiments shown, one of ordinary skill in the art will readily recognize that there could be variations to the embodiments and those variations would be within the spirit and scope of the present invention. For example, although the placement of the key frames within the still image has been described using a four-way controller and soft keys, other control mechanisms may also be used, such as a trackball, a joystick, and hardwired buttons, for example. The present invention may also be implemented in other types of digital imaging devices, such as an electronic device for archiving images that displays stored images on a television, for instance. In addition, software written according to the present invention may be stored on a computer-readable medium, such as a removable memory, or transmitted over a network, and loaded into the digital camera for execution. Accordingly, many modifications may be made by one of ordinary skill in the art without departing from the spirit and scope of the appended claims.

What is claimed is:

1. A method for enabling a user to define a panning and zooming path across a still image during movie creation in a handheld digital imaging device, the method comprising the steps of:

a) Defining a key frame position on the still image;

b) Sizing the key frame to control a zoom factor;

c) Setting the key frame to fix the key frame's position and size on the still image;

d) Repeating steps a)–c) until the user indicates the panning and zooming path is complete; and e) Calculating image frames between the key frames during movie creation.

2. The method of claim 1 wherein step 1a) further includes the steps of:

i) Automatically drawing the key frame on the image; and ii) Enabling the user to move the key frame to the desired position using a four-way controller.

3. The method of claim 1 wherein step 1a) further includes the step of:

i) Enabling a user to manually draw the key frame on the image using a four-way controller.

4. The method of claim 1 wherein step 1b) further includes the step of:

i) Setting the key frame using a button on the digital imaging device.

5. The method of claim 4 wherein step 1b)i) further includes the step of:

ii) providing a programmable soft key button to set the key frame.

6. The method of claim 5 further including the step of:

f) Enabling the user to specify if the path of panning is straight or curved.

7. The method of claim 6 further including the step of:

g) Enabling the user to specify a displacement of a plurality of key frames in time.

8. The method of claim 7 wherein step 1e) further includes the step of:

i) Enabling the user to specify a play back acceleration of the image frames between the key frames.

9. A method for enabling a user to define a panning and zooming path across a still image during movie creation in a handheld digital imaging device, the method comprising the steps of:

a) Selecting a first key frame position on the still image;

b) Defining a size for the first key frame to control a zoom factor;

c) Defining a point on the first key frame as an initial point of a vector;

d) Drawing the vector in a direction of panning;

e) Defining a starting position for a second key frame;

f) Defining a size for the second key frame to control a zoom factor;

g) Repeating steps c)–f) until the panning path is complete; and h) Calculating image frames between the key frames during movie creation.

10. A method as in claim 9 wherein step 9a) further includes the steps of:

i) Moving a cursor with a four-way controller; and ii) Setting the position of the cursor with a soft key, the cursor defining a first corner of the first key frame.

11. A method as in claim 9 wherein step 9b) further includes the step of:

i) Drawing the first key frame by dragging a corner of the first key frame that is opposite from the first corner away from the first corner using with a four-way controller.

12. A method as in claim 9 wherein step 9d) further includes the steps of:
  i) Defining a terminal point for the vector by pressing a softkey; and
  ii) Using the terminal point of the vector as the starting position for the second key frame.

13. An apparatus for enabling a user to define a panning and zooming path across a still image during movie creation in a handheld digital imaging device, comprising:
  an LCD screen for displaying the still image;
  positioning means for defining positions of a plurality of key frames on the still image;
  sizing means for sizing selected ones of the key frames to control a zoom factor;
  setting means for fixing each of the plurality's key frame's position and size on the still image; and
  calculating means for calculating image frames between the key frames during movie creation.

14. The apparatus of claim 13 wherein the digital imaging device automatically draws each of the plurality of key frames on the image, the positioning means comprising a four-way controller for enabling the user to move each key frame to a desired position.

15. The apparatus of claim 14 wherein the sizing means comprises a first soft key that increases and decreases the size of a selected key frame.

16. The apparatus of claim 15 wherein the setting means comprises a second soft key.

17. The apparatus of claim 13 wherein the positioning means enables a user to manually draw each of the plurality of key frames.

18. The apparatus of claim 17 wherein the positioning means and the sizing means comprise a four-way controller for position opposite corners of a key frame on the image.

19. A computer-readable medium containing program instructions for enabling a user to define a panning and zooming path across a still image during movie creation in a handheld digital imaging device, the program instructions for:
  a) Defining a key frame position on the still image;
  b) Sizing the key frame to control a zoom factor;
  c) Setting the key frame to fix the key frame's position and size on the still image;
  d) Repeating steps a)–c) until the user indicates the panning and zooming path is complete; and
  e) Calculating image frames between the key frames during movie creation.

20. The computer-readable medium of claim 19 wherein instruction 19a) further includes the instructions of:
  i) Automatically drawing the key frame on the image; and
  ii) Enabling the user to move the key frame to the desired position using a four-way controller.

21. The computer-readable medium of claim 20 wherein instruction 19a) further includes the instruction of:
  i) Enabling a user to manually draw the key frame on the image using a four-way controller.

22. A method for enabling a user to define a panning and zooming path across a digital still image during movie creation in a handheld digital camera, the method comprising the steps of:
  a) defining a key frame position on the still image;
  b) sizing the key frame to control a zoom factor;
  c) setting the key frame to fix the key frame's position and size on the still image;
  d) repeating steps a)–c) until the user indicates the panning and zooming path is complete;
  e) calculating image frames between the key frames during movie creation; and
  f) displaying the image frames and key frames as a movie to the user on the handheld digital camera.

23. A handheld digital camera for enabling a user to define a panning and zooming path across a digital still image during movie creation, the digital camera comprising:
  an LCD screen for displaying the still image;
  positioning means for defining positions of a plurality of key frames on the still image;
  sizing means for sizing selected ones of the key frames to control a zoom factor;
  setting means for fixing each of the plurality's key frame's position and size on the still image; and
  calculating means for calculating image frames between the key frames during movie creation, wherein the image frames and key frames are displayed as a movie to the user on the handheld digital camera's LCD screen.

* * * * *